J. H. BAUER AND W. F. KENNELL.
LIQUID LEVEL GAUGE.
APPLICATION FILED JUNE 4, 1921.

1,429,832.

Patented Sept. 19, 1922.
2 SHEETS—SHEET 1.

John H. Bauer
W. F. Kennell  INVENTOR

BY *Victor J. Evans*

ATTORNEY

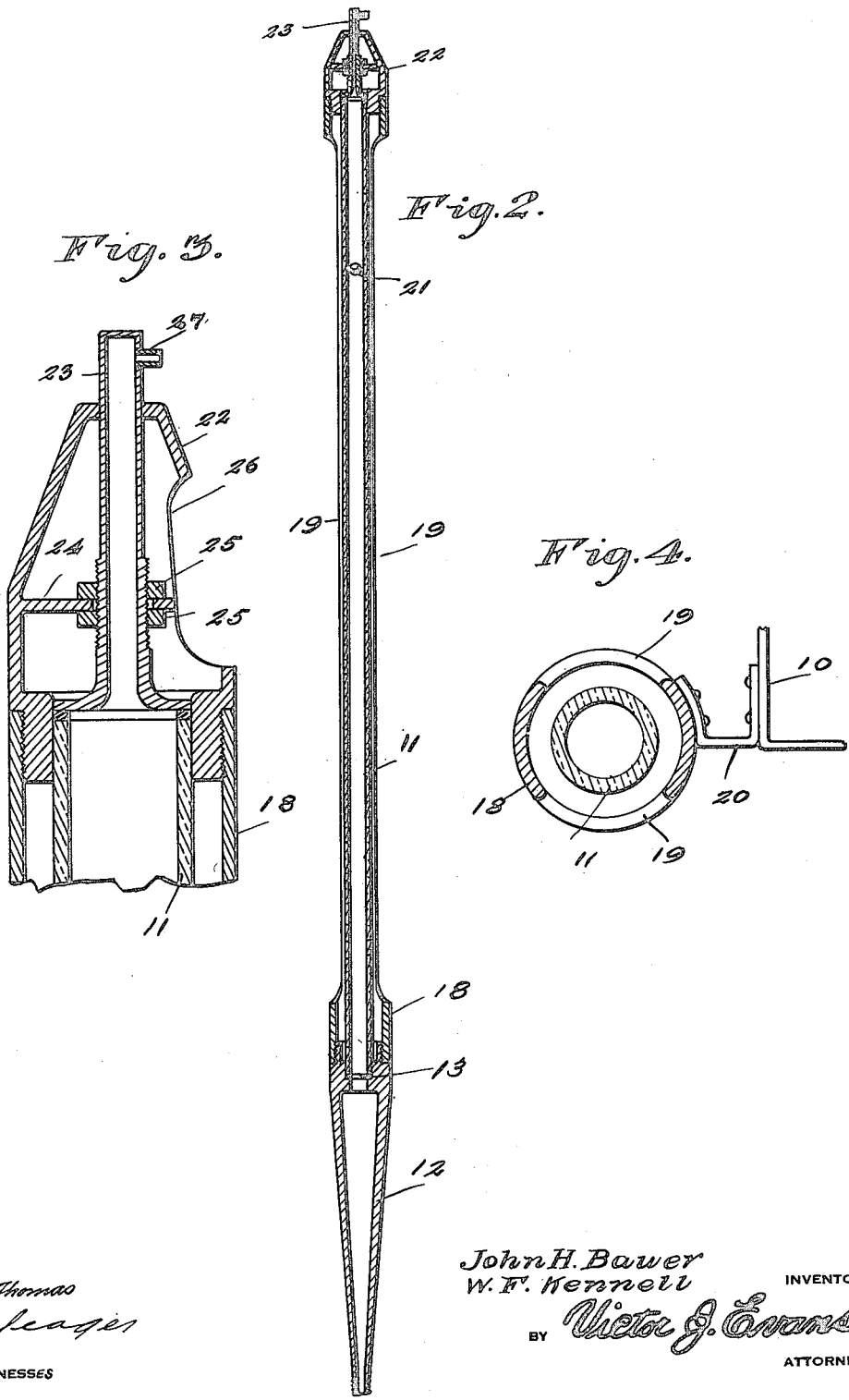

Patented Sept. 19, 1922.

1,429,832

UNITED STATES PATENT OFFICE.

JOHN H. BAUER AND WILLIAM F. KENNELL, OF STANBERRY, MISSOURI.

LIQUID-LEVEL GAUGE.

Application filed June 4, 1921. Serial No. 475,000.

*To all whom it may concern:*

Be it known that we, JOHN H. BAUER and WILLIAM F. KENNELL, citizens of the United States, residing at Stanberry, in the county of Gentry and State of Missouri, have invented new and useful Improvements in Liquid-Level Gauges, of which the following is a specification.

The present invention comprehends the provision of a radiator attachment for automobiles or the like, the attachment being in the nature of a gauge by means of which the quantity of water contained by the radiator may be quickly determined, the gauge being constructed and disposed so that it can be readily viewed from the driver's seat.

The nature and advantages of the invention will be better understood when the following detailed description is read in connection with the accompanying drawings, the invention residing in the combination, construction and arrangement of parts as claimed.

In the drawings forming part of this application, like numerals of reference indicate similar parts in the several views and wherein:

Figure 2 is a vertical sectional view through the gauge.

Figure 3 is an enlarged fragmentary view of the upper portion of the gauge showing the vent pipe in the manner of supporting the same.

Figure 4 is a transverse sectional view taken on line 4—4 of Figure 1.

Figure 1:
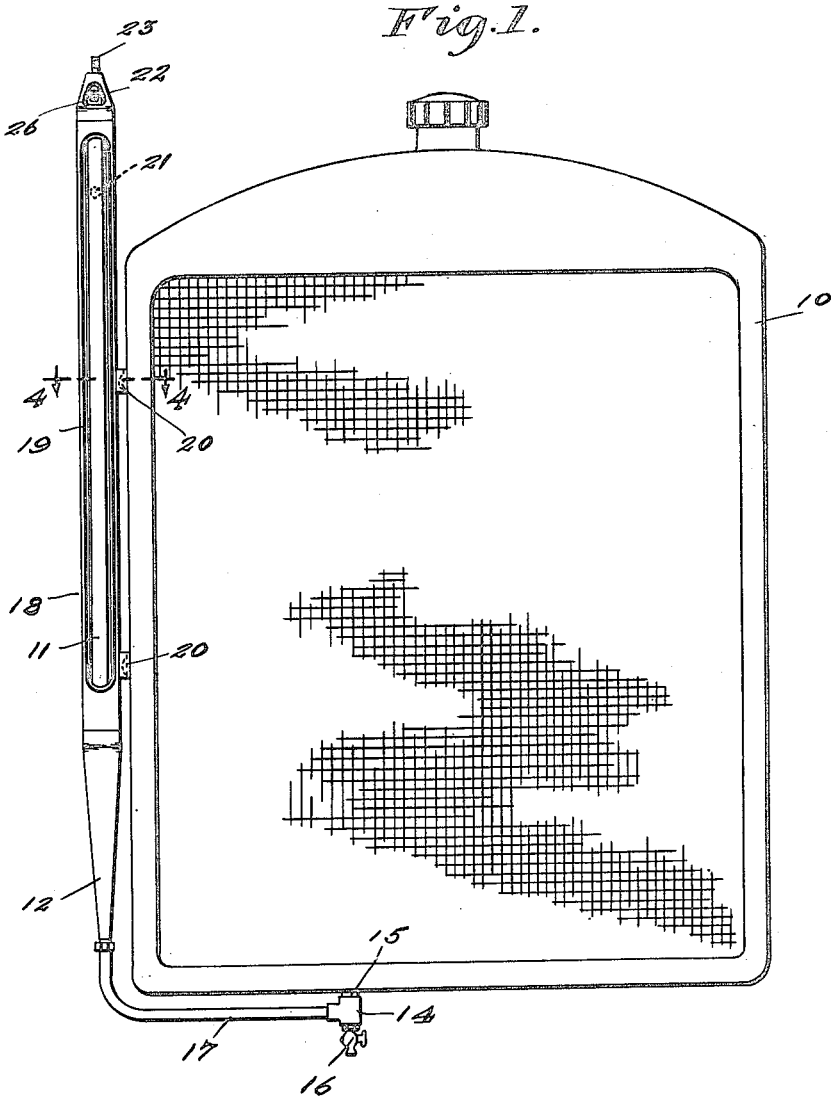
Figure 1 is a front elevation of a radiator showing the attachment associated therewith.

Referring to the drawings in detail, 10 indicates a radiator of the wellknown construction used in connection with automobile tractors, aeroplanes or the like.

The attachment forming the subject matter of this invention is disposed at one side of the radiator in full view of the operator of the vehicle, so that the level of the water in the radiator can be readily determined. The attachment comprises a water tube 11 which is preferably constructed of glass, this tube having its lower end communicating with a funnel-shaped member 12 which is in communication with the radiator.

A gasket 13 is utilized to provide a waterproof connection between the gauge tube 11 and the member 12. A T-shaped coupling 14 is connected with the outlet 15 of the radiator, and associated with the coupling 14 is a valve 16 which permits the radiator to be drained when desired, a flexible hose 17 being also connected with the T-shaped coupling and with the lower end of the member 12. Threaded to the upper end of the member 12 is a tubular casing 18 which surrounds the gauge tube 11, the casing having vertically disposed slots 19 to allow the guage tube 11 to be viewed from the driver's seat, or from a position in front of the machine, so that the level of the water in the radiator may be determined when filling the radiator so as to prevent overflow. The attachment in its entirety is supported in juxta-position to the radiator by means of clamps 20 which are secured to the radiator in any suitable manner, and engage the casing 18. The gauge projects an appreciable distance above the upper end of the radiator, while a float 21 operates within the gauge tube 11 to indicate the height of the water therein.

Threaded upon the upper end of the casing 18 is an inverted substantially conical-shaped member 22 which has a central opening in the top thereof to receive a pipe 23, the latter passing through the member 22 and designed to slip over the upper end of the gauge tube 11. The pipe 22 is provided with an extension 27 opening to the atmosphere, thereby providing a vent for the gauge, so that the water may have free circulation. The pipe 23 is passed through a supporting member 24 arranged interiorly of the member 22, while threaded upon the pipe are nuts 25 which are arranged above and below the pipe support 24, whereby the pipe is maintained in proper position. The invention is simple in construction and can be manufactured and sold at a nominal cost. The conical member 22 is provided with slots 26 to permit access being had to the nuts 25 when it is desired to separate the pipe from the gauge.

While it is believed that from the foregoing description the nature and advantages of the invention will be readily apparent, we desire to have it understood that we do not limit ourselves to what is herein shown and described, and that such changes may be resorted to when desired as fall within the scope of what is claimed.

What we claim is:

A water gauge for vehicle radiators of the character described comprising a water tube, a tubular casing provided with a pair of vertically disposed opposing elongated slots and being adapted to surround said tube, a plurality of clamps securing said tubular casing to the side of the radiator so that said slots may be viewed from both the rear and front thereof, a funnel shaped member secured at its large end to the lower end of the casing and designed to communicate with said tube, a flexible hose adapted to provide communication between the funnel shaped member and the radiator, a conical shaped member being provided with an opening in its top thereof and having its lower end threadedly secured to the upper end of said casing which is positioned above the upper end of the radiator, a pipe having one end projecting through said opening and being adapted to communicate with said tube at its opposite end thereof, said pipe being exteriorly threaded intermediate of its ends, a supporting member arranged interiorly of said conical shaped member, nuts arranged above and below said support and engaging the threads of the pipe to maintain said pipe in proper position, an extension provided on the projecting end of said pipe and adapted for admitting air to the tube and a float operating in said tube as and for the purpose specified.

In testimony whereof we affix our signatures.

JOHN H. BAUER.
WILLIAM F. KENNELL.